(12) United States Patent
Goni et al.

(10) Patent No.: US 11,204,091 B2
(45) Date of Patent: Dec. 21, 2021

(54) LUBRICATION FLUID BAFFLE FIXED IN AN AXLE HOUSING

(71) Applicant: DANA AUTOMOCION SA, Pamplona (ES)

(72) Inventors: Alberto Goni, Pamplona (ES); Juan Jose Sagastibelza, Pamplona (ES)

(73) Assignee: Dana Automoción SA, Pamplona (ES)

( * ) Notice: Subject to any disclaimer, the term of this patent is extended or adjusted under 35 U.S.C. 154(b) by 445 days.

(21) Appl. No.: 16/340,757

(22) PCT Filed: Oct. 5, 2017

(86) PCT No.: PCT/EP2017/075417
§ 371 (c)(1),
(2) Date: Apr. 10, 2019

(87) PCT Pub. No.: WO2018/069163
PCT Pub. Date: Apr. 19, 2018

(65) Prior Publication Data
US 2021/0293324 A1  Sep. 23, 2021

(30) Foreign Application Priority Data
Oct. 13, 2016  (EP) .................................... 16382467

(51) Int. Cl.
*F16H 57/04* (2010.01)
(52) U.S. Cl.
CPC ..... *F16H 57/0423* (2013.01); *F16H 57/0483* (2013.01)
(58) Field of Classification Search
None
See application file for complete search history.

(56) References Cited

U.S. PATENT DOCUMENTS

| 5,505,112 A | 4/1996 | Gee |
| 7,080,636 B2 * | 7/2006 | Knaus ................. F01M 13/022 123/572 |

(Continued)

FOREIGN PATENT DOCUMENTS

| EP | 1602861 A1 | 12/2005 |
| JP | 2005170132 A | 6/2005 |

OTHER PUBLICATIONS

European Patent Office, European Search Report and Written Opinion in Application No. 16382467.5, dated Apr. 18, 2017, 7 pages, Munich Germany.

(Continued)

*Primary Examiner* — Colby M Hansen
(74) *Attorney, Agent, or Firm* — Marshall & Melhorn, LLC

(57) ABSTRACT

A vehicle axle housing having a lower bowl portion with a bottom portion connected to a bottom portion of an axle half shaft housing at a first connection portion. A second connection portion connects a first wall of the lower bowl to a first wall of the axle half shaft housing and a third connection portion connects a second wall of the lower bowl to a second wall of the axle half shaft housing. Disposed in the second and third connection portions is one or more first and second attachment holes. A lubrication fluid baffle including a first end portion having a first bent portion, a middle portion having a second bent portion and a second end portion having a third bent portion. Extending from each side of the second bent portion is a first tab and a second tab that are disposed within the first and second attachment holes.

17 Claims, 3 Drawing Sheets

(56) References Cited

U.S. PATENT DOCUMENTS

| | | | |
|---|---|---|---|
| 2006/0179973 A1 | 8/2006 | Matsufuji et al. | |
| 2009/0218170 A1* | 9/2009 | Hoffmann | F16C 19/06 |
| | | | 184/6.22 |
| 2014/0260790 A1 | 9/2014 | Passino et al. | |

OTHER PUBLICATIONS

European Patent Office, International Search Report and Written Opinion in Application No. PCT/EP2017/075417, dated Dec. 11, 2017, 14 pages, Rijswijk Netherlands.

* cited by examiner

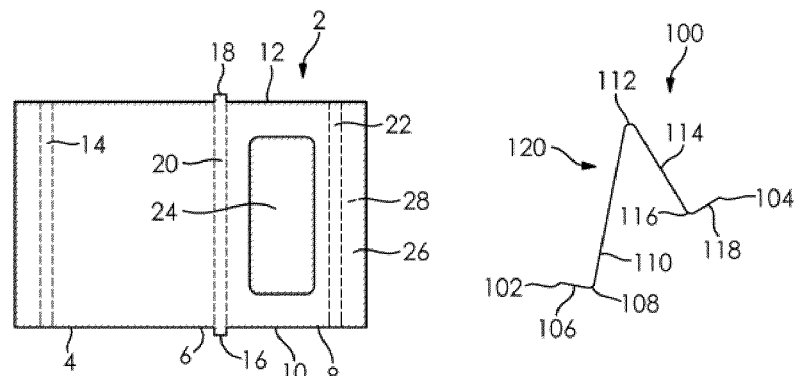
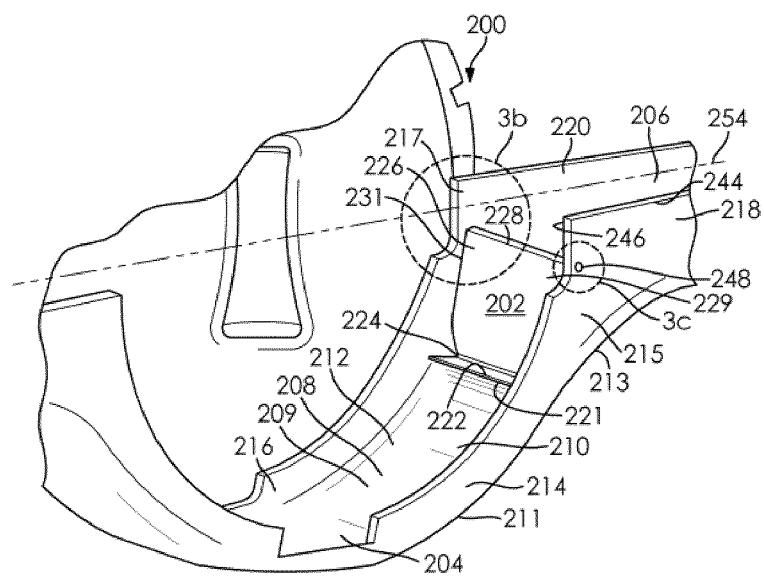

LUBRICATION FLUID BAFFLE FIXED IN AN AXLE HOUSING

FIELD OF THE DISCLOSURE

The present disclosure relates to a lubrication fluid baffle that is attached to an axle housing of a motor vehicle.

BACKGROUND OF THE DISCLOSURE

Drive train systems are widely used for generating power from a power source and transferring that power to one or more driven components. For example, the power source may be an engine and/or transmission assembly of a vehicle that generates rotational power which is then transferred through one or more drive train systems to one or more rotatably driven components, such as wheels.

Typical differential and axle assemblies include a number of rotatable components that transmit the rotational energy from the engine of the vehicle to the wheels of the vehicle. The rotatable components of the axle and differential assemblies are typically enclosed in a protective non-rotatable housing. The non-rotatable housing typically includes a central carrier that rotatably supports the differential assembly. Additionally, the non-rotatable housings include a pair of outwardly extending tubes that are disposed on axially opposing sides of the central carrier.

The differential assembly is driven by a differential input shaft which in turn drives a series of gears making up the differential assembly. The meshing gears of the differential assembly require the use of a lubricating fluid to lubricate the meshing gears. The lubrication fluid that is typically used in the industry is an oil composition. The lubricating fluid is used to reduce the amount of wear on the meshing gears, minimizes the amount of wear particles that are generated and dissipates the frictional heat that is generated by the meshing gears. In many cases the non-rotatable housing surrounding the differential assembly acts as a lubricating fluid reservoir and as a heat transfer surface.

It is common practice in the field to put enough lubricating fluid in the non-rotatable housing so that each gear will rotate through the lubricating fluid and pick up some of the lubricating fluid with the teeth of the gear. The lubricating fluid will then remain on the gear teeth at least until they come into meshing engagement with the teeth from another gear in the differential assembly.

However, there are some disadvantages to this practice. For instance, this would require that the level of the lubricating fluid be high enough such that at least a portion of the teeth of the smallest diameter gear will pass through the lubricating fluid. As a result, a larger portion of the larger diameter gears will have to rotate through the lubricating fluid. This means that the larger diameter gears are traveling much deeper into the lubricating fluid than is necessary to simply lubricate the teeth of those gears. It has been determined that this reduces the overall efficiency of the differential assembly by experiencing what is referred to as a "churning loss". The "churning loss" is a type of parasitic loss that arises as a result of the resistance offered by the lubricating fluid as the gears rotate. It would therefore be advantageous to develop a lubrication fluid baffle or a lubricating fluid deflector that will limit the amount of lubricating fluid contained within the lubricating fluid reservoir at any given time when the vehicle is in operation.

Various types of lubrication fluid baffles or lubricating fluid deflectors are known in the art. For example, U.S. Pat. No. 5,505,112 issued to Gee ("the Gee reference") and assigned to Eaton Corporation discloses a differential assembly having an annular ring gear. Surrounding the outer periphery of the annular ring gear is a reservoir member having bleed holes that are designed to reduce the amount of "churning loss" experienced by the differential assembly. The bottom portion of the reservoir member is then attached to the lower part of the housing by using a pair of bolting assemblies. Bolting the reservoir member to the lower part of the housing adds additional weight and unnecessary complexity to the assembly. As a result, it would be advantageous to develop a lubrication fluid baffle which is easily attachable and reduces the overall weight of the system.

Additionally, U.S. 2006/0179973 A1 to Matsufuji et al. ("the Matsufuji reference") and assigned to Yanmar Co. LTD. describes an oil baffle plate that is disposed within a transmission assembly that is used to separate the storage space of a transmission housing in a liquid sealing manner. The baffle plate described in the Matsufuji reference prevents the lowering of the efficiency of the transmission that is caused by the oil stored within the transmission housing.

Finally, U.S. 2014/0260790 A1 to Passino et al. ("the Passino reference") assigned to the Dana Heavy Vehicle Systems Group, LLC. describes a unitary ring gear shroud that is disposed along the outer periphery of a differential ring gear. The ring gear shroud described in the Passino reference is designed to reduce the amount of oil around the ring gear thereby reducing the amount of churning loss and improving the efficiency of the differential assembly. Additionally, the ring gear shroud is attached to an axle housing cover by using at least one weld. It would therefore be advantageous to develop a lubrication fluid baffle which is easily attachable and reduces the overall weight of the system.

SUMMARY OF THE DISCLOSURE

An axle housing for a motor vehicle having a lower bowl portion and one or more axle half shaft housings. The lower bowl portion of the axle housing has a bottom portion, a first lower bowl wall and a second lower bowl wall. The one or more axle half shaft housings have a bottom portion, a first axle half shaft housing wall and a second axle half shaft housing wall.

A first axle housing connection portion integrally connects the bottom portion of the lower bowl portion of the axle housing to the bottom portion of the one or more axle half shaft housings.

Integrally connecting the first lower bowl wall of the lower bowl portion of the axle housing to the first axle half shaft housing wall of the one or more axle half shaft housings is a second axle housing connection portion having a first side and a second side. Extending from the first side to the second side of the second axle housing connection portion of the axle housing is one or more attachment holes.

The second lower bowl wall of the lower bowl portion of the axle housing is integrally connected to the second axle half shaft housing wall of the one or more axle half shaft housings at a third axle housing connection portion having a first side and a second side. One or more second attachment holes extends from the first side to the second side of the third axle housing connection portion of the axle housing.

A lubrication fluid baffle having a first end portion, a middle portion, a second end portion, a first side, a second side, a top surface and a bottom surface is provided. The first end portion of the lubrication fluid baffle includes a first angularly bent portion that extends from the first side to the second side of the lubrication fluid baffle.

Extending from the first side to the second side of the middle portion of the lubrication fluid baffle is a second angularly bent portion. A first tab extends from and/or protrudes from at least a portion of the first side of the middle portion of the lubrication fluid baffle. At least a portion of the first tab of the lubrication fluid baffle is at least partially disposed within the one or more first attachment holes in the second axle housing connection portion of the axle housing.

A second tab extends from and/or protrudes from at least a portion of the second side of the middle portion of the lubrication fluid baffle. At least a portion of the second tab of the lubrication baffle is at least partially disposed within the one or more second attachment holes on the third axle housing connection portion of the axle housing.

Finally, the second end portion of the lubrication fluid baffle has a third angularly bent portion that extends from the first side to the second side of the lubrication fluid baffle.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 1 is a schematic top-view of a lubrication fluid baffle according to an embodiment of the disclosure;

FIG. 2 is a schematic side view of the lubrication fluid baffle according to the embodiment of the disclosure illustrated in FIG. 1;

FIG. 3 is a perspective view of an axle housing having the lubrication fluid baffle according to the embodiment of the disclosure illustrated in FIGS. 1 and 2;

FIG. 3b is a schematic cut-away view of the axle housing illustrated in FIG. 3 and the lubrication fluid baffle according to the embodiment illustrated in FIGS. 1, 2, 3 and 3a;

DETAILED DESCRIPTION OF THE DISCLOSURE

Figure 3A:
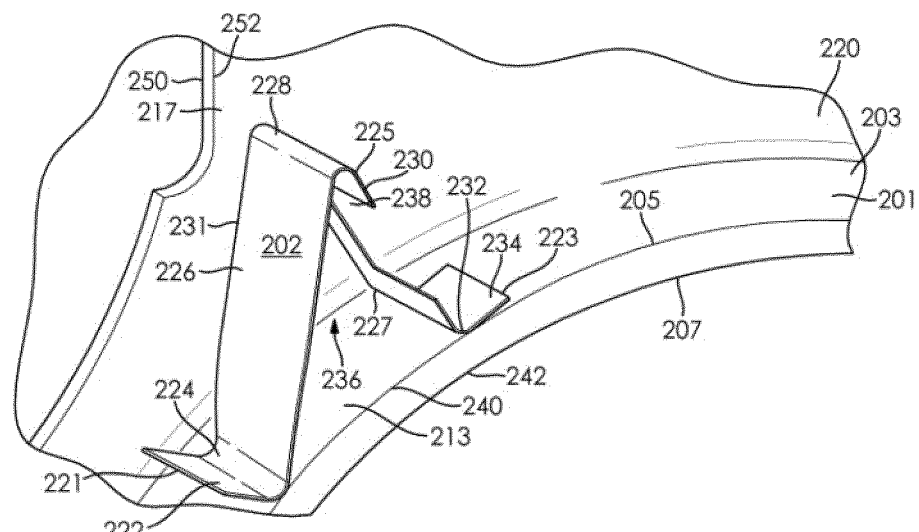
FIG. 3a is a partial cut-away perspective view of the axle housing illustrated in FIG. 3 having the lubrication fluid baffle according to the embodiment of the disclosure illustrated in FIGS. 1, 2 and 3.

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

FIG. 1 is a schematic top-view of a lubrication fluid baffle 2 according to an embodiment of the disclosure. The lubrication fluid baffle 2 has a first end portion 4, a middle portion 6, a second end portion 8, a first side 10 and a second side 12. As a non-limiting example, the lubrication fluid baffle 2 is made of an iron material, a steel composition, an aluminium and/or a carbon fibre material.

As illustrated in FIG. 1, the middle portion 6 of the lubrication fluid baffle 2 includes a first tab 16 and a second tab 18. The first tab 16 extends from and/or protrudes from at least a portion of the middle portion 6 of the first side 10 of the lubrication fluid baffle 2. Similarly, the second tab 18 extends from and/or protrudes from at least a portion of the middle portion 6 of the second side 12 of the lubrication fluid baffle 2. Furthermore, the second tab 18 on the second side 12 of the lubrication fluid baffle 2 is laterally aligned with the first tab 16 on the first side 10 of the lubrication fluid baffle 2 along the same plane.

The middle portion 6 of the lubrication fluid baffle 2 further includes a second angularly bent portion 20. In accordance with yet another embodiment of the disclosure, the first tab 16 extends from and/or protrudes from the first side 10 of the second angularly bent portion 20 and the second tab 18 extends from and/or protrudes from the second side 12 of the second angularly bent portion 20 of the lubrication fluid baffle 2. It is within the scope of this disclosure that the tabs 16 and 18 may be either bent or substantially flat and not bent.

The first end portion 4 of the lubrication fluid baffle 2 has a first angularly bent portion 14 and the second end portion 8 of the lubrication fluid baffle 2 has a third angularly bent portion 22. According to an embodiment of the disclosure, the first angularly bent portion 14, the second angularly bent portion 20 and the third angularly bent portion 22 of the lubrication fluid baffle 2 are substantially parallel to each other.

According to an embodiment of the disclosure, the lubrication fluid baffle 2 may further include one or more openings 24 that are disposed between the second angularly bent portion 20 and the third angularly bent portion 22. The one or more openings 24 disposed between the second angularly bent portion 20 and the third angularly bent portion 22 extend from a top surface 26 of the lubrication fluid baffle 2 to a bottom surface 28 of the lubrication fluid baffle 2. The one or more openings 24 allows the lubrication fluid baffle 2 to be made with less material and aids in reducing the overall weight and cost of the axle housing system (not shown). This makes the lubrication fluid baffle 2 of the present disclosure more economical compared to conventional lubrication fluid baffles currently available. As a non-limiting example, the one or more openings 24 are substantially rectangular in shape. It is within the scope of this disclosure that the corners of the one or more openings 24 may be rounded.

FIG. 2 is a schematic side view of the lubrication fluid baffle illustrated in FIG. 1 but using different set of reference numbers. The lubrication fluid baffle 100 has a first end 102 and a second end 104. As a non-limiting example, the lubrication fluid baffle 100 is made of an iron material, a steel composition, an aluminium and/or a carbon fibre material. According to an embodiment of the disclosure, the lubrication fluid baffle 100 includes in axial order from the first end 102 to the second end 104, a first substantially straight portion 106, a first angularly bent portion 108, a second substantially straight portion 110, a second angularly bent portion 112, a third substantially straight portion 114, a third angularly bent portion 116 and a fourth substantially straight portion 118.

According to an embodiment of the disclosure, the first angularly bent portion 108 is bent such that the first substantially straight portion 106 of the lubrication fluid baffle 100 is substantially perpendicular to the second substantially straight portion 110 of the lubrication fluid baffle 100. It is within the scope of this disclosure that the first angularly bent portion 108 of the lubrication fluid baffle 100 may be bent to any angle.

Similarly, the third angularly bent portion 116 is bent such that the third substantially straight portion 114 of the lubrication fluid baffle 100 is substantially perpendicular to the fourth substantially straight portion 118 of the lubrication fluid baffle 100. Additionally, the fourth substantially straight portion 118 is not planar with the first substantially straight portion 106 of the lubrication fluid baffle 100 but is axially offset from and non-parallel to the first substantially straight portion 106. Furthermore, the first angularly bent portion 108, the second angularly bent portion 112 and the third angularly bent portion 116 are parallel to each other. It is within the scope of this disclosure that the third angularly bent portion 116 of the lubrication fluid baffle 100 may be bent to any angle. As illustrated in FIG. 2, the second substantially straight portion 110, the second angularly bent portion 112 and the third substantially straight portion 114 of the lubrication fluid baffle 100 forms a V-shaped portion 120. As a result, the second substantially straight portion 110 and the third substantially straight portion 114 of the V-shaped portion 120 are not parallel to one and another. Additionally, the second substantially straight portion 110 of the V-shaped portion 120 of the lubrication fluid baffle 100 is longer than the third substantially straight portion 114. In a non-limiting example, the second angularly bent portion 112 may be bent such that the angle between the second substantially straight portion 110 and the third substantially straight portion 114 is approximately 42 degrees. It is within the scope of this disclosure that the second angularly bent portion 112 of the lubrication fluid baffle 100 may be bent to any angle.

FIGS. 3, 3a, 3b and 3c are perspective views of an axle housing 200 having the lubrication fluid baffle 202 as illustrated in FIGS. 1 and 2 but using different set of reference numbers. The axle housing 200 includes a lower bowl portion 204 that is integrally connected to one or more axle half shaft housings 206. In a non-limiting example, the axle housing is part of a forward tandem axle system (not shown), a rear tandem axle system (not shown), a front axle system (not shown) and/or a rear axle system (not shown).

The lower bowl portion 204 of the axle housing 200 includes a bottom portion 208 having a first side 210, a second side 212, a top surface 209 and a bottom surface 211. Integrally connected to the first side 210 of the bottom portion 208 of the lower bowl portion 204 is a first lower bowl wall 214. According to an embodiment of the disclosure, the first lower bowl wall 214 of the lower bowl portion 204 of the axle housing 200 extends radially inward from the first side 210 of the bottom portion 208 of the lower bowl portion 204.

Similarly, integrally connected to the second side 212 of the bottom portion 208 of the lower bowl portion 204 is a second lower bowl wall 216. According to an embodiment of the disclosure, the second lower bowl wall 216 extends radially inward from the second side 212 of the bottom portion 208 of the lower bowl portion 204.

In accordance with an embodiment of the disclosure (not shown), the axle housing further includes an upper bowl portion that is integrally connected to the lower bowl portion of the axle housing. The upper bowl portion of the axle housing us used to completely surround an upper portion of a differential assembly that is disposed within the axle housing.

The one or more axle half shaft housings 206 includes a bottom portion 201 having a first side (not shown), a second side 203, a top surface 205 and a bottom surface 207. At least a portion of the bottom portion 201 of the one or more axle half shaft housings 206 are integrally connected to at least a portion of the bottom portion 208 of the lower bowl portion 204 of the axle housing 200 at a first axle housing connection portion 213.

Integrally connected to the first side (not shown) of the bottom portion 201 of the one or more axle half shaft housings 206 is a first axle half shaft housing wall 218. According to an embodiment of the disclosure, the first axle half shaft housing wall 218 extends radially inboard from the first side (not shown) of the bottom portion 201 of the one or more axle half shaft housings 206. Additionally, at least a portion of the first axle half shaft housing wall 218 is integrally connected to at least a portion of the first lower bowl wall 214 at a second axle housing connection portion 215.

Similarly, integrally connected to the second side 203 of the bottom portion 201 of the one or more axle half shaft housings 206 is a second axle half shaft housing wall 220. According to an embodiment of the disclosure, the second axle half shaft housing wall 220 extends radially inboard from the second side 203 of the bottom portion 201 of the one or more axle half shaft housing 206. Additionally, at least a portion of the second axle half shaft housing wall 220 is integrally connected to at least a portion of the second lower bowl wall 216 at a third axle housing connection portion 217.

According to an embodiment of the disclosure (not shown), the one or more axle half shaft housings further include a top portion that is used to completely enclose and envelope one or more axle half shafts. This ensures that foreign particles to not come into contact with components of the axle system and protects the components of the axle system protected from the external environment.

It is within the scope of this disclosure that the lower bowl portion 204 and the one or more axle half shaft housings 206 of the axle housing 200 is made from a single piece forging and/or machined from a single piece of material.

Figure 3B:
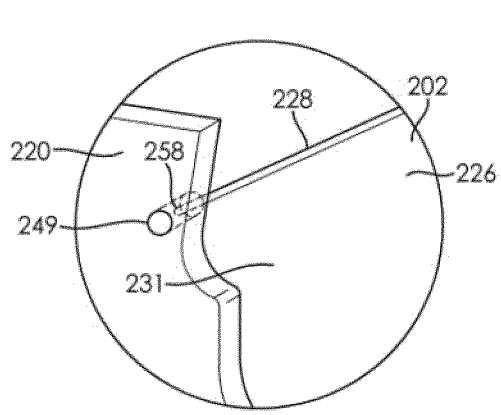
Figure 3C:
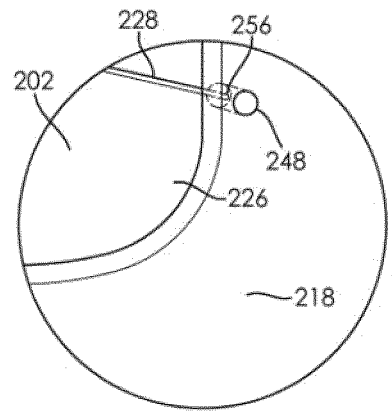
FIG. 3c is a schematic cut-away view of the axle housing system illustrated in FIG. 3 and the lubrication fluid baffle according to the embodiment illustrated in FIGS. 1, 2, 3, 3a and 3b.

As illustrated in FIGS. 3, 3a and 3b the axle housing 200 includes the lubrication fluid baffle 202. The lubrication fluid baffle 202 has a first end 221, a second end 223, a top surface 225, a bottom surface 227, a first side 229 and a second side 231. As a non-limiting example, the lubrication fluid baffle 202 is made of an iron material, a steel composition, an aluminium and/or a carbon fibre material. According to an embodiment of the disclosure, the lubrication fluid baffle 202 includes in axial order from the first end 221 to the second end 223, a first substantially straight portion 222, a first angularly bent portion 224, a second substantially straight portion 226, a second angularly bent portion 228, a third substantially straight portion 230, a third angularly bent portion 232 and a fourth substantially straight portion 234.

The lubrication fluid baffle 202 helps to reduce the amount of lubrication fluid (not shown) that is around a differential ring gear (not shown) thereby reducing the amount of churning loss and improving the overall efficiency of the axle system (not shown). As a non-limiting example, the lubrication fluid used is an oil composition. When in operation, the amount of lubrication fluid builds up on the along the third substantially straight portion 230 of the lubrication fluid baffle 202 until the lubrication fluid overflows over the second angularly bent portion 228 thereby replenishing but limiting the amount of lubrication fluid around the differential ring gear (not shown).

According to an embodiment of the disclosure, the first angularly bent portion 224 is bent such that the first substantially straight portion 222 of the lubrication fluid baffle 202 is substantially perpendicular to the second substantially straight portion 226 of the lubrication fluid baffle 202. It is within the scope of this disclosure that the first angularly bent portion 224 of the lubrication fluid baffle 202 may be bent to any angle such that at least a portion of the first substantially straight portion 222, the first angularly bent portion 224 and/or the second substantially straight portion 226 is in direct contact with and fluidly seals against at least a portion of the bottom portion 208 of the lower bowl portion 204 and/or the top surface 240 of the first axle housing connection portion 213.

Similarly, the third angularly bent portion 232 is bent such that the third substantially straight portion 230 of the lubrication fluid baffle 202 is substantially perpendicular to the fourth substantially straight portion 234 of the lubrication fluid baffle 202. Additionally, the fourth substantially straight portion 234 is not planar with the first substantially straight portion 222 of the lubrication fluid baffle 202 but is axially offset from and non-parallel to the first substantially straight portion 222. Furthermore, the first angularly bent portion 224, the second angularly bent portion 228 and the third angularly bent portion 232 are parallel to each other. It is within the scope of this disclosure that the third angularly bent portion 232 of the lubrication fluid baffle 202 may be bent to any angle such that at least a portion of the third substantially straight portion 230, the third angularly bent portion 232 and/or the fourth substantially straight portion 234 is in direct contact with and fluidly seals against at least a portion of the bottom portion 208 of the lower bowl portion 204, the top surface 240 of the first axle housing connection portion 213 and/or the bottom portion 201 of the one or more axle half shaft housings 206.

As illustrated in FIG. 3a, the second substantially straight portion 226, the second angularly bent portion 228 and the third substantially straight portion 230 of the lubrication fluid baffle 202 forms a V-shaped portion 236. In accordance with an embodiment of the disclosure (not shown) and as a non-limiting example, the second angularly bent portion may be bent such that the angle between the second substantially straight portion and the third substantially straight portion is approximately 42 degrees. It is within the scope of this disclosure that the second angularly bent portion 226 of the lubrication fluid baffle 202 may be bent to any angle. Additionally, the second substantially straight portion 226 of the lubrication fluid baffle 202 is longer than and not parallel to the third substantially straight portion 230 of the V-shaped portion 236 of the lubrication fluid baffle 202.

Disposed between the second angularly bent portion 228 and the third angularly bent portion 232 on the third substantially straight portion 230 of the lubrication fluid baffle 202 is one or more openings 238. The one or more openings 238 on the third substantially straight portion 230 extend from the top surface 225 to the bottom surface 227 of the lubrication fluid baffle 202. The one or more openings 238 allow the lubrication fluid baffle 202 to be made with less material and aids in reducing the overall weight and cost of the axle housing 200. This makes the lubrication fluid baffle 202 of the present disclosure more economical compared to conventional lubrication fluid baffles currently available. According to an embodiment of the disclosure, the one or more openings are rectangular in shape. In accordance with this embodiment of the disclosure, the corners of the one or more openings may be rounded in shape.

In order to secure the lubrication fluid baffle 202 to at least a portion of the axle housing 200 the lubrication fluid baffle 202 includes a first tab 256 and a second tab 258. The first tab 256 extends from and/or protrudes from at least a portion of the first side 229 of the second substantially straight portion 226, the second angularly bent portion 228 and/or the third substantially straight portion 230 of the lubrication fluid baffle 202. According to an embodiment of the disclosure, the first tab 256 extends from and/or protrudes from at least a portion of the first side 229 of the second angularly bent portion 228 substantially perpendicular to an axle housing orientation 254. As illustrated in FIG. 3, the axle housing orientation 254 is co-axial with the one or more axle half shaft housings 206. It is within the scope of this disclosure that the first tab 256 may be either bent or substantially flat and not bent.

The second tab 258 of the lubrication fluid baffle 202 extends from and/or protrudes from at least a portion of the second side 231 of the second substantially straight portion 226, the second angularly bent portion 228 and/or the third substantially straight portion 230 of the lubrication fluid baffle 202. According to an embodiment of the disclosure, the second tab 258 extends from and/or protrudes from at least a portion of the second side 231 of the second angularly bent portion 228 substantially perpendicular to the axle housing orientation 254. It is within the scope of this disclosure that the second tab 258 may be either bent or substantially flat and not bent.

The first axle housing connection portion 213 has a top surface 240 and a bottom surface 242. As illustrated in FIGS. 3 and 3a, at least a portion of the bottom surface 227 of the first substantially straight portion 222, the first angularly bent portion 224 and/or the second substantially straight portion 226 is in direct contact with at least a portion of the top surface 240 of the first axle housing connection portion 213. According to an alternative embodiment of the disclosure, at least a portion of the bottom surface 227 of the first substantially straight portion 222, the first angularly bent portion 224 and/or the second substantially straight portion 226 is in direct contact with at least a portion of the top surface 209 of the lower bowl portion 204 of the axle housing 200.

As illustrated in FIG. 3a, at least a portion of the bottom surface 227 of the third substantially straight portion 230, the third angularly bent portion 232 and/or the fourth substantially straight portion 234 is in direct contact with at least a portion of the top surface 240 of the first axle housing connection portion 213. According to an alternative embodiment of the disclosure, at least a portion of the bottom surface 227 of the third substantially straight portion 230, the third angularly bent portion 232 and/or the fourth substantially straight portion 234 is in direct contact with at least a portion of the top surface 209 of the lower bowl portion 204 of the axle housing 200. In accordance with yet another embodiment of the disclosure, at least a portion of the bottom surface 227 of the third substantially straight portion 230, the third angularly bent portion 232 and/or the fourth substantially straight portion 234 is in direct contact with at least a portion of the top surface 205 of the bottom portion 201 of the one or more axle half shaft housings 206.

The second axle housing connection portion 215 of the axle housing 200 has a first side 244 and a second side 246. Extending from the first side 244 of the second axle housing connection portion 215 to the second side 246 of the second axle housing connection portion 215 is one or more first attachment holes 248. The one or more first attachment holes 248 have a size and a shape that is larger than the first tab 256 such that the first tab 256 is at least partially disposed within the one or more first attachment holes 248.

The third axle housing connection portion 217 of the axle housing 200 has a first side 250 and a second side 252. Extending from the first side 250 of the third axle housing connection portion 217 to the second side 252 of the third axle housing connection portion 217 is one or more second attachment holes 249. The one or more second attachment holes 249 have a size and a shape that is larger than the second tab 258 such that the second tab 258 is at least partially disposed within the one or more second attachment holes 249. Additionally, the one or more second attachment holes 249 are axially and radially in the same plane as the one or more first attachment holes 248. Securing the lubrication fluid baffle 202 to the axle housing 200 by using the tabs 256 and 258 that are at least partially disposed in the one or more first and second attachment holes 248 and 249 allows the lubrication fluid baffle 202 to be easily secured to and removed from the axle housing 200 without the need for mechanical fasteners or tools. This simplifies the manufacturing and repair process making it more cost efficient.

According to an alternative embodiment of the disclosure (not shown), the one or more first attachment holes are located in the first lower bowl wall of the lower bowl portion of the axle housing, in the second axle housing connection portion and/or in the first axle half shaft housing wall of the one or more axle half shaft housings. Similarly, in accordance with this embodiment of the disclosure (not shown), the one or more second attachment holes are located in the second lower bowl wall of the lower bowl portion of the axle housing, in the third axle housing connection portion and/or in the second axle half shaft housing wall of the one or more axle half shaft housings.

In order to secure the lubrication fluid baffle 202 to the axle housing 200 the height of the one or more first attachment holes 248 and the height of the one or more second attachment holes 249 from the top surface 240 of the first axle housing connection portion 213, is such that the V-shaped portion 236 of the lubrication fluid baffle 202 acts as a spring clip. When assembled, the V-shaped portion 236 of the lubrication fluid baffle 202 elastically deforms and/or elastically bows outward increasing the angle between the second substantially straight portion 222 and the third substantially straight portion 230. When the V-shaped portion 236 elastically deforms and/or elastically bows outward, the lubrication fluid baffle 202 applies a force onto the bottom portion 208 of the lower bowl 204, the top surface 240 of the first axle housing connection portion 213 and/or the bottom portion 201 of the one or more axle half shaft housings 206 thereby securing the lubrication baffle 202 to the axle housing 200.

According to an alternative embodiment of the disclosure (not shown), the lubrication fluid baffle may be formed as an integral part of the axle housing and not included as a separate component. In accordance with this embodiment of the disclosure (not shown), the lubrication fluid baffle is forged as part of the axle housing and/or machined into the axle housing.

Figure 4:
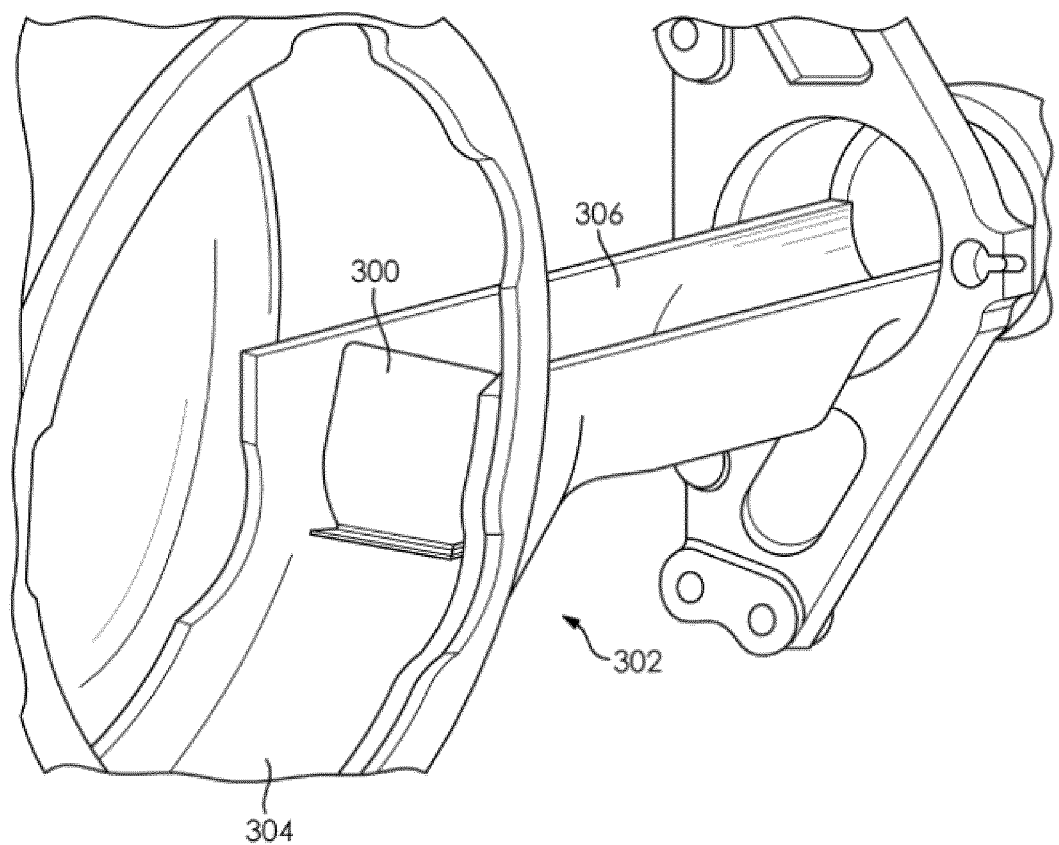
FIG. 4 is another perspective view of an alternative axle housing having the lubrication fluid baffle illustrated in FIGS. 1, 2, 3, 3a and 3b.

FIG. 4 is another perspective view of an alternative axle housing having the lubrication fluid baffle illustrated in FIGS. 1, 2, 3, 3a, 3b and 3c but using different set of reference numbers. As illustrated in FIG. 4, the lubrication fluid baffle 300 is disposed within an axle housing 302. The axle housing 302 includes a lower bowl portion 304 and an axle half shaft housing 306. In a non-limiting example, the axle housing is part of a forward tandem axle system (not shown), a rear tandem axle system (not shown), a front axle system (not shown) and/or a rear axle system (not shown).

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

The subject matter of the present application relates to inter, inter alia, the following aspects:

1. A lubrication fluid baffle, comprising:
an axle housing having comprising a lower bowl portion and one or more axle half shaft housings; wherein said lower bowl portion of said axle housing has a bottom portion, a first lower bowl wall and a second lower bowl wall;
wherein said one or more axle half shaft housings having a bottom portion, a first axle half shaft housing wall and a second axle half shaft hosing wall;
wherein said bottom portion of said lower bowl portion of said axle housing connects to said bottom portion of said one or more axle half shaft housings at a first axle housing connection portion;
wherein said first lower bowl wall of said lower bowl portion of said axle housing connects to said first axle half shaft housing wall of said one or more axle half shaft housings at a second axle housing connection portion having a first side and a second side;
wherein said second axle housing connection portion has one or more first attachment holes extending from said first side to said second side of said second axle housing connection portion;
wherein said second lower bowl wall of said lower bowl portion of said axle housing connects to said second axle half shaft hosing wall of said one or more axle half shaft housings at a third axle housing connection portion having a first side and a second side;
wherein said third axle housing connection portion has one or more second attachment holes extending from said first side to said second side of said second axle housing connection portion;
a lubrication fluid baffle having a first end portion, a middle portion, a second end portion, a first side, a second side, a top surface and a bottom surface;
wherein said first end portion of said lubrication fluid baffle has a first angularly bent portion that extends from said first side to said second side of said lubrication fluid baffle;
wherein said middle portion of said lubrication fluid baffle has a second angularly bent portion that extends from said first side to said second side of said lubrication fluid baffle;
wherein said middle portion of said lubrication fluid baffle further comprises a first tab and a second tab;
wherein said first tab of said lubrication fluid baffle extends from and/or protrudes from at least a portion of said first side of said middle portion of said lubrication fluid baffle;
wherein at least a portion of said first tab on said first side of said middle portion of said lubrication fluid baffle is at least partially disposed within said one or more first attachment holes in said second axle housing connection portion of said axle housing;
wherein said second tab of said lubrication fluid baffle extends from and/or protrudes from at least a portion of said second side of said middle portion of said lubrication fluid baffle;
wherein at least a portion of said second tab on said second side of said middle portion of said lubrication fluid baffle is at least partially disposed within said one or more second attachment holes in said third axle housing connection portion of said axle housing; and wherein said second end portion of said lubrication fluid baffle has a third angularly bent portion that extends from said first side to said second side of said lubrication fluid baffle.

2. The lubrication fluid baffle of aspect 1, wherein said lubrication fluid baffle is made of an iron composition, a steel composition, an aluminium composition and/or a carbon fibre composition.

3. The lubrication fluid baffle of aspect 1, wherein said lubrication fluid baffle acts like a spring clip.

4. The lubrication fluid baffle of aspect 1, wherein said one or more first attachment holes in said second axle housing connection portion of said axle housing and said one or more second attachment holes in said third axle housing connection portion of said axle housing are axially in the same plane and radially in the same plane.

5. The lubrication fluid baffle of aspect 1, further comprising: one or more openings;

wherein said one or more openings is disposed between said second angularly bent portion of said lubrication fluid baffle and said third angularly bent portion of said lubrication fluid baffle; and wherein said one or more openings extend from said top surface to said bottom surface of said lubrication fluid baffle.

6. The lubrication fluid baffle of aspect 5, wherein said one or more openings in said lubrication fluid baffle are substantially rectangular in shape.

7. A lubrication fluid baffle, comprising:

an axle housing having comprising a lower bowl portion and one or more axle half shaft housings;

wherein said lower bowl portion of said axle housing has a bottom portion, a first lower bowl wall and a second lower bowl wall;

wherein said one or more axle half shaft housings having a bottom portion, a first axle half shaft housing wall and a second axle half shaft hosing wall;

wherein said bottom portion of said lower bowl portion of said axle housing connects to said bottom portion of said one or more axle half shaft housings at a first axle housing connection portion;

wherein said first lower bowl wall of said lower bowl portion of said axle housing connects to said first axle half shaft housing wall of said one or more axle half shaft housings at a second axle housing connection portion having a first side and a second side;

wherein said second axle housing connection portion has one or more first attachment holes extending from said first side to said second side of said second axle housing connection portion;

wherein said second lower bowl wall of said lower bowl portion of said axle housing connects to said second axle half shaft hosing wall of said one or more axle half shaft housings at a third axle housing connection portion having a first side and a second side;

wherein said third axle housing connection portion has one or more second attachment holes extending from said first side to said second side of said second axle housing connection portion;

a lubrication fluid baffle having a first end, a second end, a first side, a second side, a top surface and a bottom surface;

wherein said lubrication fluid baffle comprises in axial order from said first end to said second end of said lubrication fluid baffle a first substantially straight portion, a first angularly bent portion, a second substantially straight portion, a second angularly bent portion, a third substantially straight portion, a third angularly bent portion and a fourth substantially straight portion;

wherein said second substantially straight portion, said second angularly bent portion and said third substantially straight portion of said lubrication fluid baffle forms a V-shaped portion;

wherein a first tab extends from and/or protrudes from at least a portion of said first side of said second angularly bent portion of said lubrication fluid baffle;

wherein at least a portion of said first tab on said first side of said second angularly bent portion is at least partially disposed within said one or more first attachment holes in said second axle housing connection portion of said axle housing;

wherein a second tab extends from and/or protrudes from at least a portion of said second side of said second angularly bent portion of said lubrication fluid baffle; and wherein at least a portion of said second tab on said second side of said second angularly bent portion is at least partially disposed within said one or more second attachment holes in said third axle housing connection portion of said axle housing.

8. The lubrication fluid baffle of aspect 7, wherein said lubrication fluid baffle is made of an iron composition, a steel composition, an aluminium composition and/or a carbon fibre composition.

9. The lubrication fluid baffle of aspect 7, wherein said V-shaped portion of said lubrication fluid baffle acts like a spring clip.

10. The lubrication fluid baffle of aspect 7, wherein at least a portion of said first substantially straight portion, said first angularly bent portion and/or said second substantially straight portion of said lubrication fluid baffle is in direct contact with at least a portion of and applies a force onto at least a portion of said bottom portion of said lower bowl portion and/or said first axle housing connection portion of said axle housing; and wherein at least a portion of said third substantially straight portion, said third angularly bent portion and/or said fourth substantially straight portion of said lubrication fluid baffle is in direct contact with at least a portion of and applies a force onto at least a portion of said bottom portion of said lower bowl portion, said first axle housing connection portion of said axle housing and/or said bottom portion of said one or more axle half shaft housings of said axle housing.

11. The lubrication fluid baffle of aspect 7, wherein said one or more first attachment holes in said second axle housing connection portion of said axle housing and said one or more second attachment holes in said third axle housing connection portion of said axle housing are axially in the same plane and radially in the same plane.

12. The lubrication fluid baffle of aspect 7, wherein said first substantially straight portion of said lubrication fluid baffle is substantially perpendicular to said second substantially straight portion of said lubrication fluid baffle; and wherein said third substantially straight portion of said lubrication fluid baffle is substantially perpendicular to said fourth substantially straight portion of said lubrication fluid baffle.

13. The lubrication fluid baffle of aspect 7, further comprising: one or more openings;

wherein said one or more openings is disposed between said second angularly bent portion and said third angularly bent portion of said lubrication fluid baffle in said third substantially straight portion of said lubrication fluid baffle; and wherein said one or more openings extend from said top surface of said third substantially straight portion to said bottom surface of said third substantially straight portion of said lubrication fluid baffle.

14. The lubrication fluid baffle of aspect 13, wherein said one or more openings in said lubrication fluid baffle are substantially rectangular in shape.

15. A lubrication fluid baffle, comprising:
a lubrication fluid baffle having a first end, a second end, a first side, a second side, a top surface and a bottom surface;
wherein said lubrication fluid baffle comprises in axial order from said first end to said second end of said lubrication fluid baffle a first substantially straight portion, a first angularly bent portion, a second substantially straight portion, a second angularly bent portion, a third substantially straight portion, a third angularly bent portion and a fourth substantially straight portion;
wherein said first angularly bent portion, said second angularly bent portion and said third angularly bent portion are parallel to each other;
wherein said first substantially straight portion and said fourth substantially straight portion of said lubrication fluid baffle axially and radially offset from each other;
wherein said first substantially straight portion and said fourth substantially straight portion of said lubrication fluid baffle are not parallel to each other;
wherein said second substantially straight portion, said second angularly bent portion and said third substantially straight portion of said lubrication fluid baffle forms a V-shaped portion;
wherein said second substantially straight portion is longer than said third substantially straight portion;
wherein a first tab extends from and/or protrudes from at least a portion of said first side of said second angularly bent portion of said lubrication fluid baffle;
wherein a second tab extends from and/or protrudes from at least a portion of said second side of said second angularly bent portion of said lubrication fluid baffle; and
wherein said third substantially straight portion has one or more openings that extend from said top surface of said third substantially straight portion of said lubrication fluid baffle to said bottom surface of said third substantially straight portion of said lubrication fluid baffle.

The invention claimed is:
1. An axle housing assembly, comprising:
an axle housing comprising a lower bowl portion and one or more axle half shaft housings;
wherein said lower bowl portion has a bottom portion, a first lower bowl wall and a second lower bowl wall;
wherein said one or more axle half shaft housings have a bottom portion, a first axle half shaft housing wall and a second axle half shaft hosing wall;
wherein said bottom portion of said lower bowl portion connects to said bottom portion of said one or more axle half shaft housings at a first axle housing connection portion;
wherein said first lower bowl wall connects to said first axle half shaft housing wall at a second axle housing connection portion having a first side and a second side;
wherein said second axle housing connection portion has one or more first attachment holes extending from said first side to said second side of said second axle housing connection portion;
wherein said second lower bowl wall connects to said second axle half shaft hosing wall at a third axle housing connection portion having a first side and a second side;
wherein said third axle housing connection portion has one or more second attachment holes extending from said first side to said second side of said third axle housing connection portion;
a lubrication fluid baffle having a first end, a second end, a first side, a second side, a top surface and a bottom surface;
wherein said lubrication fluid baffle comprises in axial order from said first end to said second end of said lubrication fluid baffle a first substantially straight portion, a first angularly bent portion, a second substantially straight portion, a second angularly bent portion, a third substantially straight portion, a third angularly bent portion and a fourth substantially straight portion;
wherein a first tab protrudes from at least a portion of said first side of said lubrication fluid baffle;
wherein at least a portion of said first tab is disposed within said one or more first attachment holes;
wherein a second tab protrudes from at least a portion of said second side of said lubrication fluid baffle; and
wherein at least a portion of said second tab on said second side is disposed within said one or more second attachment holes.

2. The axle housing assembly of claim 1, wherein said lubrication fluid baffle is made of an iron composition, a steel composition, an aluminium composition and/or a carbon fibre composition.

3. The axle housing assembly of claim 1, wherein at least a portion of said first substantially straight portion, said first angularly bent portion and/or said second substantially straight portion of said lubrication fluid baffle is in direct contact with at least a portion of and applies a force onto at least a portion of said bottom portion of said lower bowl portion and/or said first axle housing connection portion of said axle housing; and
wherein at least a portion of said third substantially straight portion, said third angularly bent portion and/or said fourth substantially straight portion of said lubrication fluid baffle is in direct contact with at least a portion of and applies a force onto at least a portion of said bottom portion of said lower bowl portion, said first axle housing connection portion of said axle housing and/or said bottom portion of said one or more axle half shaft housings of said axle housing.

4. The axle housing assembly of claim 1, wherein said one or more first attachment holes in said second axle housing connection portion of said axle housing are aligned with said one or more second attachment holes in said third axle housing connection portion of said axle housing.

5. The axle housing assembly of claim 1, wherein said first substantially straight portion of said lubrication fluid baffle is substantially perpendicular to said second substantially straight portion of said lubrication fluid baffle; and
wherein said third substantially straight portion of said lubrication fluid baffle is substantially perpendicular to said fourth substantially straight portion of said lubrication fluid baffle.

6. The axle housing assembly of claim 1, further comprising: one or more openings;
wherein said one or more openings are disposed between said second angularly bent portion and said third angularly bent portion of said lubrication fluid baffle in said third substantially straight portion of said lubrication fluid baffle; and wherein said one or more openings extend from said top surface of said third substantially straight portion to said bottom surface of said third substantially straight portion of said lubrication fluid baffle.

7. The axle housing assembly of claim 6, wherein said one or more openings in said lubrication fluid baffle are substantially rectangular in shape.

8. The axle housing assembly of claim 1, wherein said second substantially straight portion, said second angularly bent portion and said third substantially straight portion of said lubrication fluid baffle forms a V-shaped portion.

9. The axle housing assembly of claim 8, wherein said V-shaped portion of said lubrication fluid baffle acts like a spring clip.

10. The axle housing assembly of claim 1, wherein said first tab protrudes from at least a portion of said first side of said second angularly bent portion of said lubrication fluid baffle; and wherein said second tab protrudes from at least a portion of said second side of said second angularly bent portion of said lubrication fluid baffle.

11. A lubrication fluid baffle, comprising:

a lubrication fluid baffle having a first end, a second end, a first side, a second side, a top surface and a bottom surface;

wherein said lubrication fluid baffle comprises in axial order from said first end to said second end of said lubrication fluid baffle a first substantially straight portion, a first angularly bent portion, a second substantially straight portion, a second angularly bent portion, a third substantially straight portion, a third angularly bent portion and a fourth substantially straight portion;

wherein said first substantially straight portion and said fourth substantially straight portion of said lubrication fluid baffle are axially and radially offset from each other;

wherein a first tab protrudes from at least a portion of said first side of said lubrication fluid baffle; and wherein a second tab protrudes from at least a portion of said second side of said lubrication fluid baffle.

12. The lubrication fluid baffle of claim 11, wherein said second substantially straight portion, said second angularly bent portion and said third substantially straight portion of said lubrication fluid baffle forms a V-shaped portion.

13. The lubrication fluid baffle of claim 11, wherein said first angularly bent portion, said second angularly bent portion and said third angularly bent portion are parallel to each other.

14. The lubrication fluid baffle of claim 11, wherein said first substantially straight portion and said fourth substantially straight portion of said lubrication fluid baffle are not parallel to each other.

15. The lubrication fluid baffle of claim 11, wherein said second substantially straight portion is longer than said third substantially straight portion of said lubrication fluid baffle.

16. The lubrication fluid baffle of claim 11, wherein said third substantially straight portion has one or more openings that extend from said top surface to said bottom surface of said third substantially straight portion of said lubrication fluid baffle.

17. The lubrication fluid baffle of claim 11, wherein said first tab protrudes from at least a portion of said first side of said second angularly bent portion of said lubrication fluid baffle; and wherein said second tab protrudes from at least a portion of said second side of said second angularly bent portion of said lubrication fluid baffle.

* * * * *